US006760794B2

(12) United States Patent
Deno et al.

(10) Patent No.: US 6,760,794 B2
(45) Date of Patent: Jul. 6, 2004

(54) METHOD FOR DECREASING DOWNTIME IN VEHICLE IDENTIFICATION NUMBER STAMPING OPERATIONS

(75) Inventors: John Deno, Anniston, AL (US); Jay Johnson, Eastaboga, AL (US); Rick Dalton, Bremen, GA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 74 days.

(21) Appl. No.: 10/301,964

(22) Filed: Nov. 22, 2002

(65) Prior Publication Data

US 2004/0103074 A1 May 27, 2004

(51) Int. Cl.[7] ................................................ G06F 13/14

(52) U.S. Cl. ............................ 710/52; 40/911; 40/912; 40/630; 427/7; 455/557; 400/127

(58) Field of Search ............................ 710/52; 40/911, 40/912, 630; 427/7; 455/557; 400/127

(56) References Cited

U.S. PATENT DOCUMENTS 5,893,097 A 4/1999 Hayata et al.
6,049,892 A 4/2000 Casagrande et al.
6,131,096 A 10/2000 Ng et al.
6,163,278 A 12/2000 Janman
6,226,650 B1 5/2001 Mahajan et al.
6,453,210 B1 * 9/2002 Belotserkovskiy et al. ... 700/96
6,708,045 B1 * 3/2004 Lieu et al. .................. 455/557

* cited by examiner

*Primary Examiner*—A. Elamin
(74) *Attorney, Agent, or Firm*—Rankin, Hill, Porter & Clark LLP; Alan T. McDonald; Vincent Ciamacco

(57) ABSTRACT

Vehicle identification number (VIN) data acquisition and stamping center control, wherein a main computer supplies VIN data to a PLC disposed at the stamping center, and the PLC stores a quantity of VIN data, up to a predetermined maximum, in an input buffer memory of the PLC in order to permit the stamping center to continue operating even when the network connection with the main computer is broken. The PLC also includes an output buffer memory in which stamped VINs may be stored until the network connection is restored, at which point the stamped VINs are transmitted to the main computer. Alternative semi-automatic and manual modes of operation permit the stamping center to continue operating even when the supply of VIN data from the input buffer memory is exhausted.

18 Claims, 1 Drawing Sheet

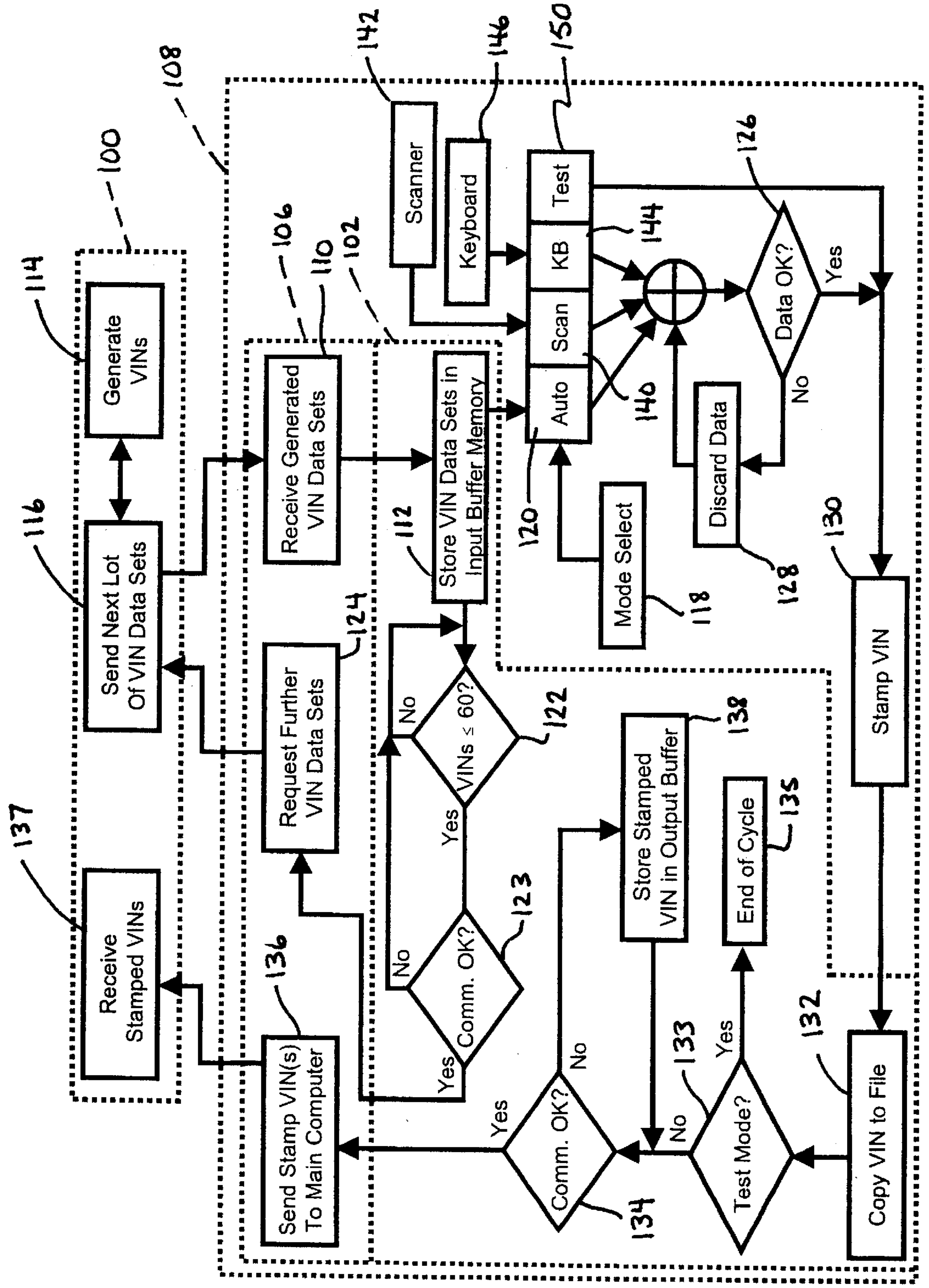
100
114
Generate VINs
116
Send Next Lot Of VIN Data Sets
137
Receive Stamped VINs
108
106
110
102
Receive Generated VIN Data Sets
124
Request Further VIN Data Sets
136
Send Stamp VIN(s) To Main Computer
112
Store VIN Data Sets in Input Buffer Memory
122
VINs ≤ 60?
Yes
No
123
Comm. OK?
Yes
No
142
Scanner
146
Keyboard
150
Test
144
KB
Scan
140
Auto
120
Mode Select
118
126
Data OK?
Yes
No
Discard Data
128
130
Stamp VIN
138
Store Stamped VIN in Output Buffer
135
End of Cycle
134
Comm. OK?
Yes
No
133
Test Mode?
Yes
No
132
Copy VIN to File

METHOD FOR DECREASING DOWNTIME IN VEHICLE IDENTIFICATION NUMBER STAMPING OPERATIONS

BACKGROUND OF THE INVENTION

1. Field of the Invention

The present invention is generally directed toward stamping operations and, more particularly, toward data communications for vehicle identification number stamping operations.

2. Description of Related Art

Vehicle identification numbers (sometimes referred to as VINs hereinafter), which are stamped on or adjacent the dashboard of vehicles, and must be carefully controlled to correspond, in a one-to-one relationship, with the resulting vehicles. Traditionally, the VINs are generated by a dedicated computer system, such as a mainframe computer, a central computer system, or the like (hereinafter referred to as the main computer). The generated VINs are transmitted individually, via a data communications link such as a factory-wide network, to a programmable controller provided at a remote VIN stamping center. The VIN stamping center, upon receipt of the VIN, adjusts a series of ring dies so that the desired VIN is stamped into a vehicle dashboard, and the stamping center communicates confirmation of same to the main computer. Thereafter, the main computer generates and transmits a subsequent VIN to the stamping center, and the stamping process continues.

The foregoing system works well under normal conditions. However, should there be an interruption in the network connection between the stamping center and the main computer, the VIN stamping operation is interrupted. Conventionally, if the network connection is interrupted, the VIN stamping operation must either stop, or must proceed manually. Manual operation is problematic, as it requires significant care to ensure that the appropriate VIN is selected and stamped, and to ensure that the stamped VIN is correctly recorded at the time of stamping and then later in the main computer when the network connection is restored.

In response to this problem, it has been proposed to provide a local computer adjacent the VIN stamping center. In this countermeasure, the local computer is connected to the main computer via the network connection and receives one or more VINs to be used sequentially. The local computer transfers the VINs to the stamping center PLC via a further network connection, and transfers stamped VINs (VINs used in the stamping operation) to the main computer. When the local computer has exhausted its supply of stored VIN's, it transmits a request to the main computer, and further VIN's are transmitted to the local computer for subsequent use.

Unfortunately, even in this improved system, if any interruption in communication is experienced, the VIN stamping operation is interrupted. For example, if there is break in the network connection between the local computer and the stamping center, of if the local computer fails, the VIN stamping operation will be interrupted. Further, if there is a break in the network connection between the local computer and the main computer, the supply of VINs to the stamping center will ultimately be interrupted.

Therefore, there exists a need in the art for a method and for a system that will insure that an interruption in communication of VINs from the main computer to the stamping center will not prevent normal stamping of VINs by the stamping center. There further exists a need in the art for method and system for locally storing stamping results in the event that data communication to the main computer is interrupted.

SUMMARY OF THE INVENTION

The present invention is directed toward a method and a system for insuring that a temporary break in communication between the main computer and the stamping center will not prevent normal stamping of VINs by the stamping center. The present invention is further directed toward a method and system for locally storing stamping results in the event that data communication to the main computer is interrupted, and for subsequent communication of stored stamping results to the main computer when data communications are restored. Finally, the present invention is directed toward a system and method comprising alternative VIN data input means to the stamping center, as may be necessary during extended or prolonged interruption of a data communication between the main computer and the stamping center.

In accordance with the present invention, a vehicle identification number data acquisition and stamping method for a vehicle identification number stamping center is provided. The method includes the steps of generating a plurality of vehicle identification numbers in a main computer, transmitting the plurality vehicle identification numbers to a programmable logic controller disposed at the stamping center, storing the plurality of individual vehicle identification numbers in an input buffer memory of the programmable logic controller, and serially accessing individual ones of said plurality of vehicle identification numbers for use in a stamping operation.

In further accordance with the present invention, a quantity of vehicle identification numbers is monitored and, when the quantity falls below a predetermined minimum, the main computer is requested to send further vehicle identification numbers to the programmable logic controller. In this manner, the programmable logic controller normally contains a quantity of vehicle identification numbers between the predetermined minimum and the predetermined maximum, the predetermined minimum being selected such that the stamping operation can continue uninterrupted even when the communications link between the programmable logic controller and the main computer is not operational.

In further accordance with the present invention, the programmable logic controller, following a successful stamping operation, transmits the stamped vehicle identification number to the main computer. When the communications link is not operational, the programmable logic controller stores the stamped vehicle identification number in an output buffer for later communication to the main computer upon reestablishment of the communications link. The output buffer is adapted to hold a quantity of stamped vehicle identification numbers that is at least equal to, and preferably significantly greater than, the predetermined maximum number stored in the input buffer to permit the stamping operation to proceed unimpeded in a manual or semi-automatic mode of operation even when the communication between the programmable logic controller and the main computer is interrupted for an extended period of time.

BRIEF DESCRIPTION OF THE DRAWING

These and further features of the invention will be apparent with reference to the following description and drawing, which schematically illustrates a vehicle identification number acquisition and communication system according to the present invention.

DETAILED DESCRIPTION OF THE PREFERRED EMBODIMENTS

Data flow using the method of the present invention is schematically illustrated in FIG. 1. As shown, the data flow or data communication is between the main computer 100 and the stamping center programmable logic controller or PLC 102 takes place over a network connection 104 via an intermediate communications interface 106. The communications interface 106 is disposed locally with the PLC 102 at the stamping center 108 and may be considered to be integral with the PLC 102 so that further data links or network connections therebetween are unnecessary. Similarly, the stamping center PLC 102 is integrated into the stamping center 108 so that information from the PLC 102 is directly supplied to the stamping center controller without further data links or network connections.

Generally, communication between the main computer 100 and PLC 102 is two-way, in that the main computer 100 transmits VIN data to the stamping center PLC 102 via the communications interface 106, and the stamping center PLC 102 transmits requests for further VIN data to the main computer 100 via the communications interface 106. Accordingly, transmission of VIN data from the main computer 100 to the PLC 102 is preferably controlled by signals or requests sent from the PLC 102.

More specifically, the PLC 102 includes an input buffer memory 112 that is capable of storing sufficient VIN data to perform stamping operations for a predetermined time period. Preferably, the predetermined time period is at least one hour in length, and may be significantly longer. By storing VIN data in the PLC 102, the stamping center 108 is capable of performing stamping operations without interruption even when the communication link or network connection 104 between the main computer 100 and the stamping center PLC 102 is broken. By storing VIN data capable of permitting stamping operations for a period of between about one hour and two hours, sufficient time is provided to permit repair or reestablishment of the network connection 104 between the main computer 100 and the PLC 102.

The main computer 100 is adapted to generate VIN data 114, and to send VIN data 116 to the stamping center PLC 102 in batches or lots. The communications interface 106 receives the lot of VIN data 110, and transfers it to the PLC input buffer memory 112. In the preferred and illustrated embodiment, each lot includes less than or equal to thirty VIN data sets. As used herein the term "VIN data" is meant to include the vehicle identification number itself as well as the lot number and any additional data related to the VIN that may be necessary or desired. Such additional data may include time, date, shift, and operator information.

The VIN data sets are stored in the PLC's input buffer memory 112. The PLC input buffer memory 112 is adapted to hold a predetermined maximum number of input VIN data sets. Preferably, the predetermined maximum number of input VIN data sets is sufficient to enable uninterrupted operation of the stamping center 108 for at least 1.5 hours. In the preferred embodiment of the present invention, the predetermined maximum number of input VIN data sets is equal to about 90. Naturally, the predetermined maximum number of input VIN data sets may be greater than or less than 90 without departing from the scope and spirit of the present invention. For example, upon enlargement of the input buffer memory capacity, the predetermined maximum number of VIN data sets may be increased to permit uninterrupted operation of the stamping center 108 for two hours, four hours, or more, as desired.

When the VIN data acquisition mode select 118 is in the "auto" setting 120, the VIN data sets stored in the PLC input buffer memory 112 are sequentially or serially made available to the stamping center controller for use in a stamping operation. When any particular VIN data set is accessed by the stamping center 108, the remaining number of VIN data sets stored in the PLC input buffer memory 112 is reduced by one.

The number of VIN data sets stored in the PLC input buffer memory 112 is monitored 122, and when the number reaches or falls below a predetermined minimum number, the PLC 102 sends a request for another lot of VIN data sets to the main computer 100 via the communications interface 106 and the network connection 104. If communication between the PLC 102 and the main computer 100 via the communications interface 106 and network connection 104 are available 123, the PLC's request for another lot of VIN data sets is sent immediately. Otherwise, the request is held until the communications are reestablished. Preferably, the predetermined number of VIN data sets is the number that is required to permit uninterrupted operation of the stamping center 108 for at least one hour. In the operational environment of the present invention, the predetermined minimum number is equal to sixty. Naturally, the present invention is not limited to the presently preferred number of VIN data sets, but rather may be relatively greater or less than sixty, as desired.

The stamping center controller checks the VIN data 126 to insure that it is satisfactory. If the VIN data is determined to be defective, the data is dumped or discarded 128, and the next or subsequent VIN data is accessed from the PLC input buffer memory 112. If the VIN data is acceptable, the stamping center controller adjusts the ring dies to correspond with the VIN, and the VIN is stamped into the dashboard 130. Thereafter, the VIN is copied to a file 132 and the mode of operation is checked 133. If the mode select 118 is in the "test" mode, described hereinafter, the cycle ends without transmitting the stamped VIN to the main computer 100. However, in the present case the mode select 118 is in the auto mode 120, the mode select 118 is in the auto mode 120, therefore the process continues to the communications status stage.

Keeping in mind that the communication between the PLC 102 and main computer 100 is constantly monitored 134, if communication between the PLC 102 and the main computer 100 via the communications interface 104 is available, the just-stamped VIN is sent to the main computer 100. The main computer 100 receives the stamped VIN 137, and uses this information for tracking, correlating, and record keeping purposes. If communication between the PLC 102 and the main computer 100 is not available, the previously stamped VIN is stored in an output buffer memory 138 provided by the PLC 102. The output buffer memory 138 is sized so that a predetermined maximum number of stamped VINs may be stored for subsequent communication to the main computer 100 upon reestablishment of the communications link.

The predetermined maximum number of stamped VINs is preferably at least as great as the predetermined maximum number of input VIN data sets that may be stored in the input buffer memory 112, and will permit uninterrupted operation of the stamping center 108 for at least 1.5 hours, and preferably much more than 1.5 hours, should the network connection 104 between the PLC 102 and the main computer 100 be broken. In the preferred embodiment, the predetermined maximum number of stamped VINs is preferably greater than 90 and more preferably is equal to or greater than 180 to permit extended semi-manual, as will be described more fully hereinafter.

In some circumstances the foregoing automatic mode 120 of stamping center operation may be undesired or impossible. For example, this could occur should the PLC 102 fail. Automatic operation could also be impossible if the network connection 104 between the main computer 100 and communications interface/PLC is interrupted for a period of time such that the VIN data stored in the input buffer memory 112 is exhausted. In these circumstances, alternative VIN input methods and modes of operation are provided in accordance with the present invention, and are described hereinafter.

A first semi-automatic mode 140 of stamping center VIN data acquisition involves scanning the VIN in the form of a bar code into the stamping center controller. If a scanning mode is selected by the mode select 118, the VIN information, in the form of a barcode, is scanned into the stamping center 108 via a conventional bar code scanner 142.

A second semi-automatic mode 144 of stamping center VIN data acquisition involves inputting the VIN via keyboard 146 into the stamping center controller. This second semi-automatic mode may be desired should scanning be inconvenient.

In each of the first and second semi-automatic modes 140, 144 of stamping center VIN data acquisition, the data checking and storing process proceeds generally as in the automatic mode 120 described hereinbefore. Namely, the data is checked 126 to determine whether it is satisfactory. If the VIN data is determined to be defective, the data is dumped or discarded 128, and the next or subsequent VIN data is accessed using same or different mode of VIN data acquisition. If the VIN data is acceptable, the stamping center controller adjusts the ring dies to correspond with the VIN, and the VIN is stamped into the dashboard 130. Thereafter, the VIN is copied to a file 132 and the mode of operation is checked 133. If the mode select 118 is in the "test" mode, described hereinafter, the cycle ends without transmitting the stamped VIN to the main computer 100. However, in the present case the mode select 118 is in one of the semi-automatic modes of operation 140, 144, so the process continues to check the communications status.

If communication between the PLC 102 and the main computer 100 is available 134, the just-stamped VIN is communicated to the main computer 100. If communication between the PLC 102 and the main computer 100 is not available, the previously stamped VIN is stored in the output buffer memory 138 for subsequent transmission to the main computer 100 when the network connection 104 is restored.

The test mode of operation 150 involves manual advance or adjustment of the stamping center ring dies, and is used to test the functionality of the stamping center and, therefore, the stamped VIN information is not communicated to the main computer 100 and is not stored in the output buffer memory 138. Further, the previously described data verification 126 is bypassed, and the VIN, which was manually set via manipulation of the ring dies, is stamped into the vehicle dashboard 130. The VIN is copied to a file 132 and, upon confirmation that the stamping center 108 is operating in the test mode 133, the test cycle ends 135.

Although the present invention has been described hereinbefore with particularity, the present invention is not limited thereto. Rather, it is considered apparent that the method of the present invention is capable of numerous modifications, replacements of steps, and rearrangements of steps without departing from the scope and spirit of the invention as defined in the claims appended hereto.

What is claimed is:

1. A vehicle identification number data acquisition and stamping method for use in conjunction with a vehicle identification number stamping center, said data acquisition and stamping method comprising the steps of:

generating a plurality of vehicle identification numbers in a main computer;

transmitting said plurality vehicle-identification numbers to a programmable logic controller, said controller including an input buffer memory and an output buffer memory, said input buffer memory being adapted to store a predetermined maximum number of vehicle identification numbers;

serially accessing individual ones of said plurality of vehicle identification numbers stored in said input buffer memory for subsequent use in a vehicle identification number stamping operation;

monitoring a quantity of vehicle identification numbers stored in said input buffer memory and, when said quantity is equal to a predetermined minimum number, requesting said main computer to send further vehicle identification numbers to said programmable logic controller such that, so long as a communication link between said main computer and said programmable logic controller is operational, the quantity of vehicle identification numbers contained in the programmable logic controller input buffer memory is always maintained between said predetermined minimum and said predetermined maximum number.

2. The method according to claim 1, wherein said predetermined minimum number of vehicle identification numbers is selected such that said stamping operation can proceed for a predetermined length of time when said communications link between said main computer and said programmable logic controller is disrupted.

3. The method according to claim 1, comprising the further step of:

checking the accessed vehicle identification number and, if said vehicle identification number is satisfactory, using said accessed vehicle identification number in the stamping operation as a stamped vehicle identification number and, if said vehicle identification number is defective, discarding said defective vehicle identification number and accessing a next vehicle identification number.

4. The method according to claim 3, comprising the further step of:

copying said stamped vehicle identification number to a file and, if said communication link between said programmable logic controller and said main computer is operational, transmitting said stamped vehicle identification number to said main computer.

5. The method according to claim 4, comprising the further step of:

if said communication link between said programmable logic controller is not operational, storing said stamped vehicle identification number in said output buffer memory, said output buffer memory being adapted to store a quantity of stamped vehicle identification numbers that is equal to or greater than said predetermined maximum number of vehicle identification numbers.

6. The method according to claim 5, wherein said predetermined minimum number of vehicle identification numbers is selected such that said stamping operation can proceed for a predetermined length of time when said communications link between said main computer and said programmable logic controller is disrupted.

7. The method according to claim 6, wherein said quantity of stamped vehicle identification numbers stored in said output buffer memory is selected such that said stamping operation can proceed even when said quantity of vehicle identification numbers stored in the input buffer memory is exhausted.

8. The method according to claim 7, wherein, in addition to vehicle identification numbers accessed from the input buffer memory, vehicle identification numbers may be made available to the stamping operation by means of semi-automatic data input means.

9. The method according to claim 7, wherein, during a test mode of operation, vehicle identification numbers are manually input, said manually input vehicle identification numbers being discarded after use in a stamping operating and therefore are not communicated to the main computer.

10. A vehicle identification number data acquisition, communication, and stamping method for a vehicle identification number stamping center, said data acquisition, communication, and stamping method comprising the steps of:

generating a plurality of vehicle identification numbers in a main computer;

transmitting said plurality vehicle identification numbers to a programmable logic controller, said controller including an input buffer memory and an output buffer memory, said input buffer memory being adapted to store a predetermined maximum number of vehicle identification numbers;

monitoring a communications link between said main computer and said programmable logic controller;

serially accessing individual ones of said plurality of vehicle identification numbers stored in said input buffer memory for subsequent use in a vehicle identification number stamping operation;

monitoring a quantity of vehicle identification numbers stored in said input buffer memory and, when said quantity is equal to a predetermined minimum number and said communication link between said main computer and said programmable logic controller is operational, requesting said main computer to send further vehicle identification numbers to said programmable logic controller such that the quantity of vehicle identification numbers contained in the programmable logic controller input buffer memory is normally maintained between said predetermined minimum and said predetermined maximum number;

using said accessed vehicle identification number in a stamping operation as a stamped vehicle identification number; and, transmitting said stamped vehicle identification number from said programmable logic controller to said main computer.

11. The method according to claim 10, wherein, if said communications link between said main computer and said programmable logic controller is not operational, said stamped vehicle identification number is stored in said output buffer memory.

12. The method according to claim 11, wherein, upon reestablishment of said communications link, the stamped vehicle identification number stored in said output buffer memory is transmitted to said main computer.

13. The method according to claim 12, comprising the further step of:

checking the accessed vehicle identification number and, if said vehicle identification number is satisfactory, using said accessed vehicle identification number in the stamping operation as a stamped vehicle identification number and, if said vehicle identification number is defective, discarding said defective vehicle identification number and accessing a next vehicle identification number.

14. The method according to claim 13, wherein said predetermined minimum number of vehicle identification numbers is selected such that said stamping operation can proceed for a predetermined length of time when said communications link between said main computer and said programmable logic controller is disrupted.

15. The method according to claim 14, wherein said quantity of stamped vehicle identification numbers stored in said output buffer memory is selected such that said stamping operation can proceed even when said quantity of vehicle identification numbers stored in the input buffer memory is exhausted.

16. The method according to claim 15, wherein, in addition to vehicle identification numbers accessed from the input buffer memory, vehicle identification numbers may be made available to the stamping operation by means of semi-automatic data input means.

17. The method according to claim 16, wherein, during a test mode of operation, vehicle identification numbers are manually input, said manually input vehicle identification numbers being discarded after use in a stamping operating and therefore are not communicated to the main computer.

18. The method according to claim 16, wherein said semi-automatic data input means are selected from the group consisting of scanning and keyboarding.

* * * * *